(12) United States Patent
Banister et al.

(10) Patent No.: US 10,440,089 B2
(45) Date of Patent: Oct. 8, 2019

(54) METHOD TO REPLICATE COMPLEX DATA STRUCTURES USING MULTIPLE QUERIES

(71) Applicants: Richard Banister, Vista, CA (US); William Dubberley, Pulaski, TN (US)

(72) Inventors: Richard Banister, Vista, CA (US); William Dubberley, Pulaski, TN (US)

(*) Notice: Subject to any disclaimer, the term of this patent is extended or adjusted under 35 U.S.C. 154(b) by 707 days.

(21) Appl. No.: 14/680,051

(22) Filed: Apr. 6, 2015

(65) Prior Publication Data
US 2016/0292251 A1    Oct. 6, 2016

(51) Int. Cl.
G06F 17/30 (2006.01)
H04L 29/08 (2006.01)
G06F 16/27 (2019.01)

(52) U.S. Cl.
CPC .............. *H04L 67/02* (2013.01); *G06F 16/27* (2019.01); *H04L 67/1002* (2013.01)

(58) Field of Classification Search
CPC ..................................................... G06F 17/30
USPC ......................................................... 707/706
See application file for complete search history.

(56) References Cited

U.S. PATENT DOCUMENTS

| | | | | |
|---|---|---|---|---|
| 5,909,678 | A * | 6/1999 | Bergman | G06F 16/3322 |
| 7,941,408 | B2 * | 5/2011 | Sinha | G06F 16/219 |
| | | | | 707/685 |
| 2005/0120062 | A1 * | 6/2005 | Sinha | G06F 16/219 |
| 2007/0185937 | A1 | 8/2007 | Prahlad | |
| 2010/0318495 | A1 | 12/2010 | Yan | |
| 2011/0167148 | A1 | 7/2011 | Bodziony et al. | |
| 2012/0221522 | A1 | 8/2012 | Allman et al. | |
| 2013/0191523 | A1 | 7/2013 | Yan | |
| 2013/0232331 | A1 * | 9/2013 | Farhan | G06F 11/3006 |
| | | | | 713/100 |
| 2013/0238552 | A1 | 9/2013 | Salb | |
| 2013/0339379 | A1 * | 12/2013 | Ferrari | G06F 16/284 |
| | | | | 707/766 |
| 2014/0229506 | A1 | 8/2014 | Lee | |
| 2015/0378865 | A1 * | 12/2015 | Robertson | G06F 11/0766 |
| | | | | 714/57 |
| 2016/0292251 | A1 * | 10/2016 | Banister | H04L 67/02 |
| 2016/0294943 | A1 * | 10/2016 | Banister | G06F 16/27 |
| 2017/0109360 | A1 * | 4/2017 | Hill | G06F 16/7837 |

* cited by examiner

*Primary Examiner* — Kim T Nguyen
(74) *Attorney, Agent, or Firm* — Patrick Reilly

(57) ABSTRACT

A system and method enable the modification of software data queries for the purpose of overcoming the problem of large, cumbersome data queries. The method and system presented includes a client device, which may split a software data query into segments representing a fraction of the original query size, and submit the divided data query to a remote server. The division of the initial query may continue until the query size is usable by the remote server. The remote server may receive the segmented query, and transmit database records associated with the fields in the divided query to the client device. Further segments of the divided query may be transmitted until the full query has been transmitted to the remote server. The divided queries may include date time stamp bounds to determine the desired database records. A computing device created specifically for the above-listed tasks may be utilized.

16 Claims, 12 Drawing Sheets

REMOTE SERVER PROCESS

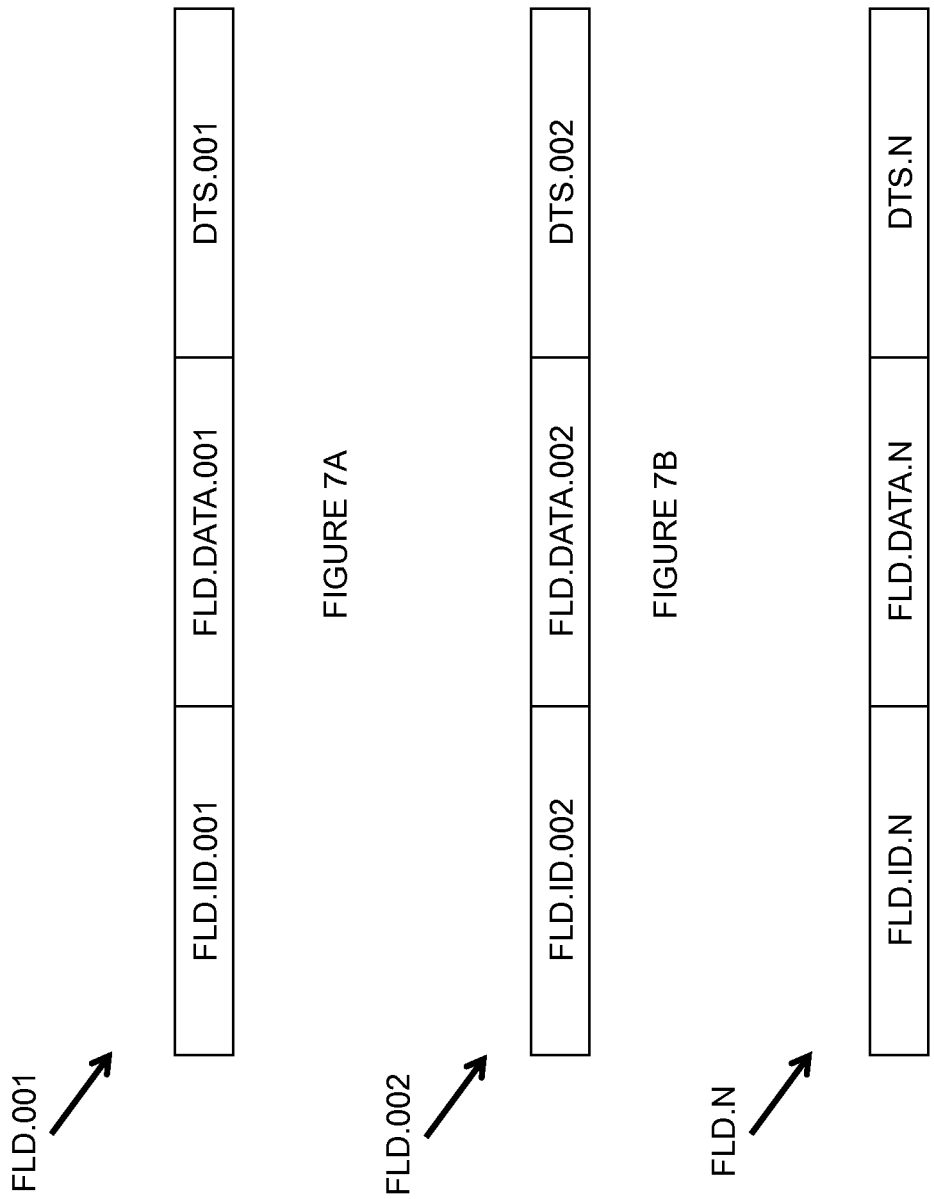

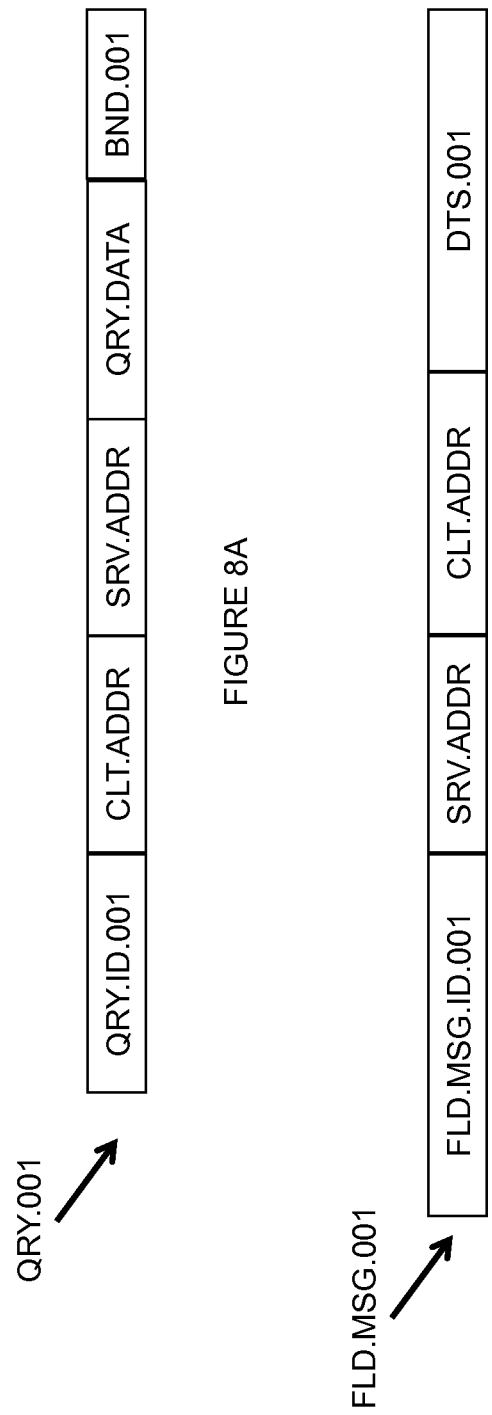

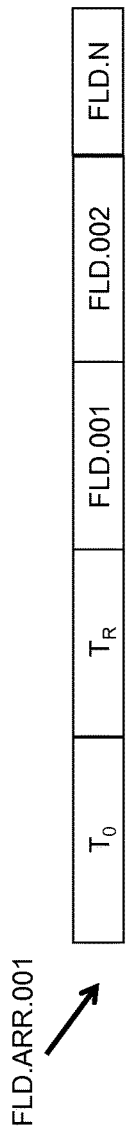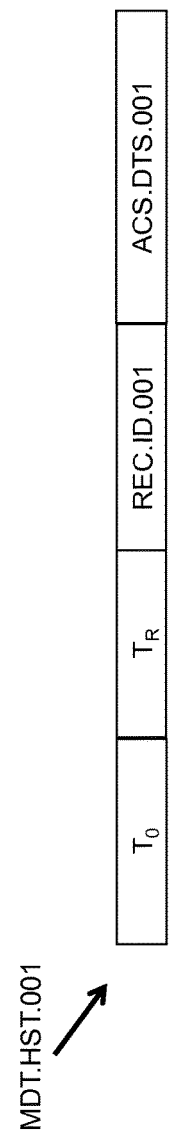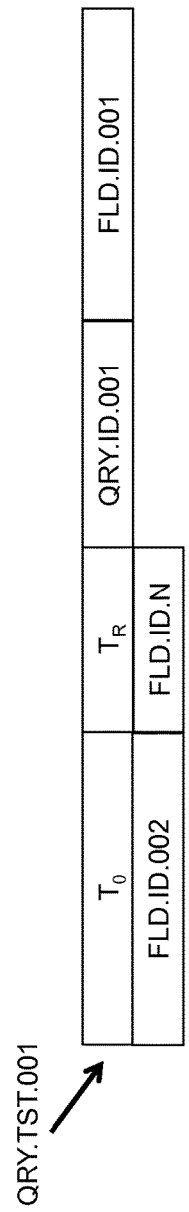

METHOD TO REPLICATE COMPLEX DATA STRUCTURES USING MULTIPLE QUERIES

FIELD OF THE INVENTION

The present invention relates to the relatedness of two or more databases within an electronic communications network. More particularly, the present invention relates to the control of the size and complexity of one or more software query.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The prior art provides a method for querying a remote server for data record keys; however, the prior art fails to optimize the means by which queries are sent, received, and answered. Objects in a data model may have an extremely large number of fields. A very large number of fields may lead to very complicated query statements, wherein the query statements surpass the limits of the source system. The prior art enables only complicated methods to acquire the data or, or demands a choice between data fields, to remain under data limits. There is therefore a long-felt need to provide a method and system that provide efficient, means of dividing a query into manageable segments, such that an entire query may be transmitted, without loss of data.

SUMMARY AND OBJECTS OF THE INVENTION

Towards these objects and other objects that will be made obvious in light of the present disclosure, a system and method are provided that enable a first computing device to create a map of digital data fields, the first computing device further designating initial and final time date stamps to designate a plurality of software record updates. The method of the present invention (hereinafter "the invented method") further includes the first computing device initiating a first query for one or more digital data fields, wherein the digital data fields may be selected from the previously generated map of digital data fields, and the first computing device transmitting the first query to a second computing device. The invented method subsequently involves the first computing device receiving one or more software records from the second computing device. The first computing device may then generate and transmit a second query to the second computing device, wherein the second query may contain at least an initial and a final date time stamp for the purpose of specifying one or more data records for transmission. The second computing device may subsequently transmit the one or more specified data records to the first computing device.

The invented method may further include the second computing device receiving the initial and the final time date stamps from the first computing device and transmitting the one or more software records associated with the initial and the final time date stamps to the first computing device.

According to alternate embodiments of the invented method, an invented computational device is provided. The invented computational device (hereinafter, "invented device") includes a memory coupled with a processor, wherein the memory and the processor may enable a database management software; the capacity to specify beginning and ending date time stamps; the capacity to generate and transmit one or more data queries to a remote computing device; the capacity to receive one or more software field updates from the remote computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

These, and further features of the invention, may be better understood with reference to the accompanying specification and drawings depicting the preferred embodiment, in which:

FIG. 7A is a block diagram of an exemplary first data field message of FIG. 4B, FIG. 5B and FIG. 6B;

FIG. 7B is a block diagram of an exemplary second data field of FIG. 4B, FIG. 5B and FIG. 6B;

FIG. 7C is a block diagram of an exemplary Nth data field of FIG. 4B, FIG. 5B and FIG. 6B;

FIG. 8A is a block diagram of an exemplary first software query of FIG. 4B, FIG. 5B and FIG. 6B;

FIG. 8B is a block diagram of an exemplary first field message;

FIG. 9A is a block diagram of an exemplary first field array of FIG. 2;

FIG. 9B is a block diagram of an exemplary first piece of historical metadata FIG. 2; and FIG. 9C is a block diagram of an exemplary first test query of FIG. 2.

DETAILED DESCRIPTION

Figure 1:
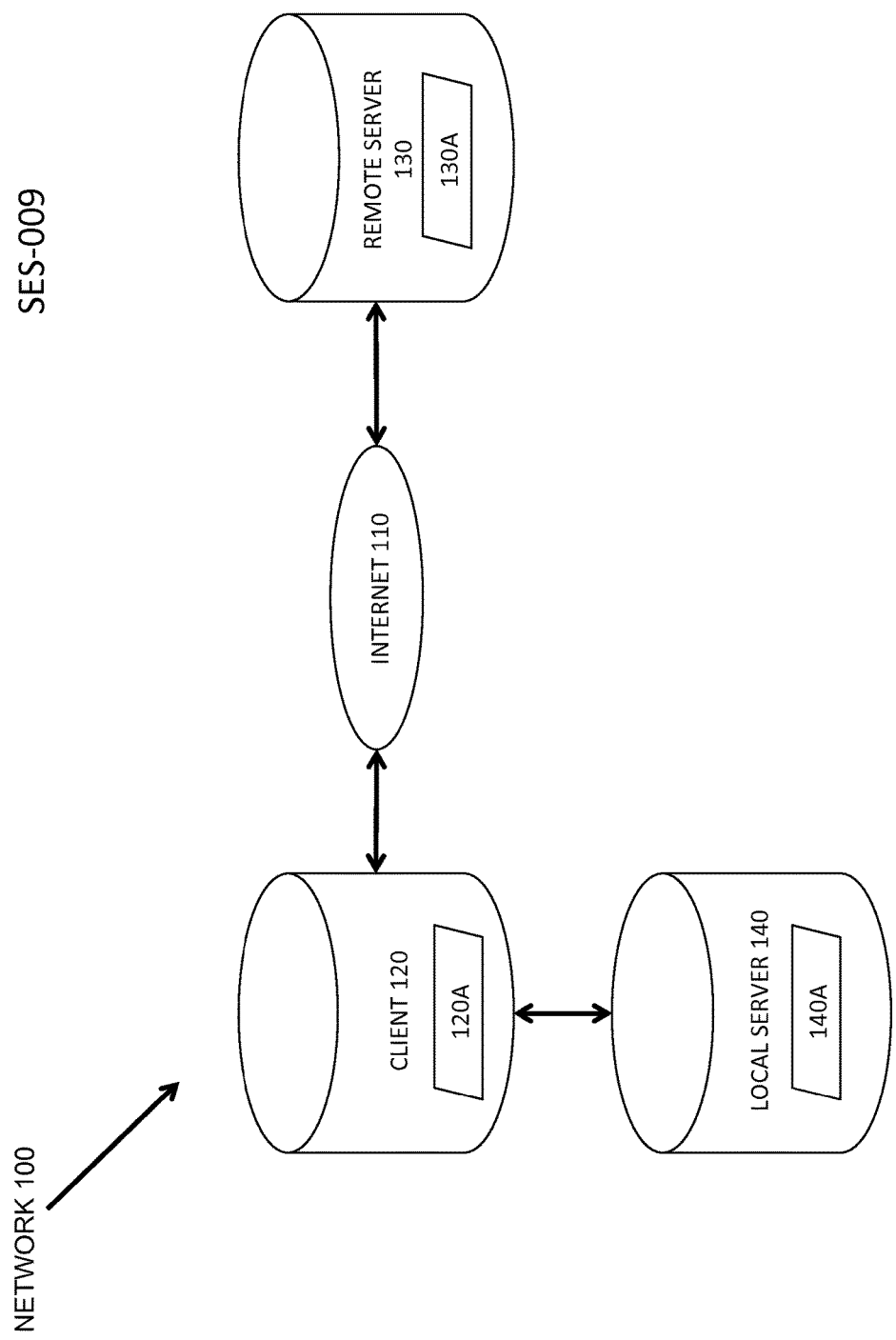
FIG. 1 is a diagram of an electronic communications network, comprising a client and a remote server, bi-directionally communicatively coupled via the Internet.

Referring now generally to the Figures, and particularly to FIG. 1, FIG. 1 is a diagram of an electronic communications network 100, optionally comprising the Internet 110. The electronic communications network 100 may further comprise a client 120, a remote server 130 and a local server 140. The electronic communications network 100 bi-directionally communicatively couples, wherein the bidirectional communicative coupling may be accomplished via the Internet 110 and/or other suitable communications structures, equipment systems known in the art. The client 120, the remote server 130 and the local server 140 each preferably comprise or are bi-directionally communicatively coupled with a separate database management system software, respectively a client DBMS 120A, a remote DBMS 130A, and a local DBMS 140A.

The client DBMS 120A, the remote DBMS 130A and/or the local DBMS 140A may be or comprise an object oriented database management system ("OODBMS") and/or a relational database management system ("RDBMS"), and one or more databases DBS 1201, DBS 1301, and/or DBS 1401 may be or comprise an object oriented database and/or a relational database. More particularly, the client DBMS 120A and/or the remote server DBMS 130A may be or comprise one or more prior art database management systems including, but not limited to, an ORACLE DATABASE™ database management system marketed by Oracle Corporation, of Redwood City, Calif.; a Database 2™, also known as DB2™, relational database management system as marketed by IBM Corporation of Armonk, N.Y.; a Microsoft SQL Server™ relational database management system as marketed by Microsoft Corporation of Redmond, Wash.; MySQL™ as marketed by Oracle Corporation of Redwood City, Calif.; and a MONGODB™ as marketed by MongoDB, Inc. of New York City, USA; and the POSTGRESQL™ open source object-relational database management system.

The remote server 130 may bi-directionally communicate and transfer data with the client 120 via the network 100 by suitable electronic communications messaging protocols and methods known in the art including, but not limited to, Simple Object Access Protocol, Representational State Transfer, and/or a web service adapted to conform with the architecture and structure of the World Wide Web.

It is understood that the client 120 comprises a client system software program SW.CLT comprised within, hosted by and/or enabled by a bundled computer software and hardware product such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling a electronic communications and database management operations known in the art.

It is understood that the remote server 130 additionally comprises a remote system software program SW.RMT comprised within, hosted by and/or enabled by a bundled computer software and hardware product, such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling a electronic communications and database management operations known in the art.

It is understood that the local server 140 also comprises a local system software program SW.LOC comprised within, hosted by and/or enabled by a bundled computer software and hardware product, such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling a electronic communications and database management operations known in the art.

Figure 2:
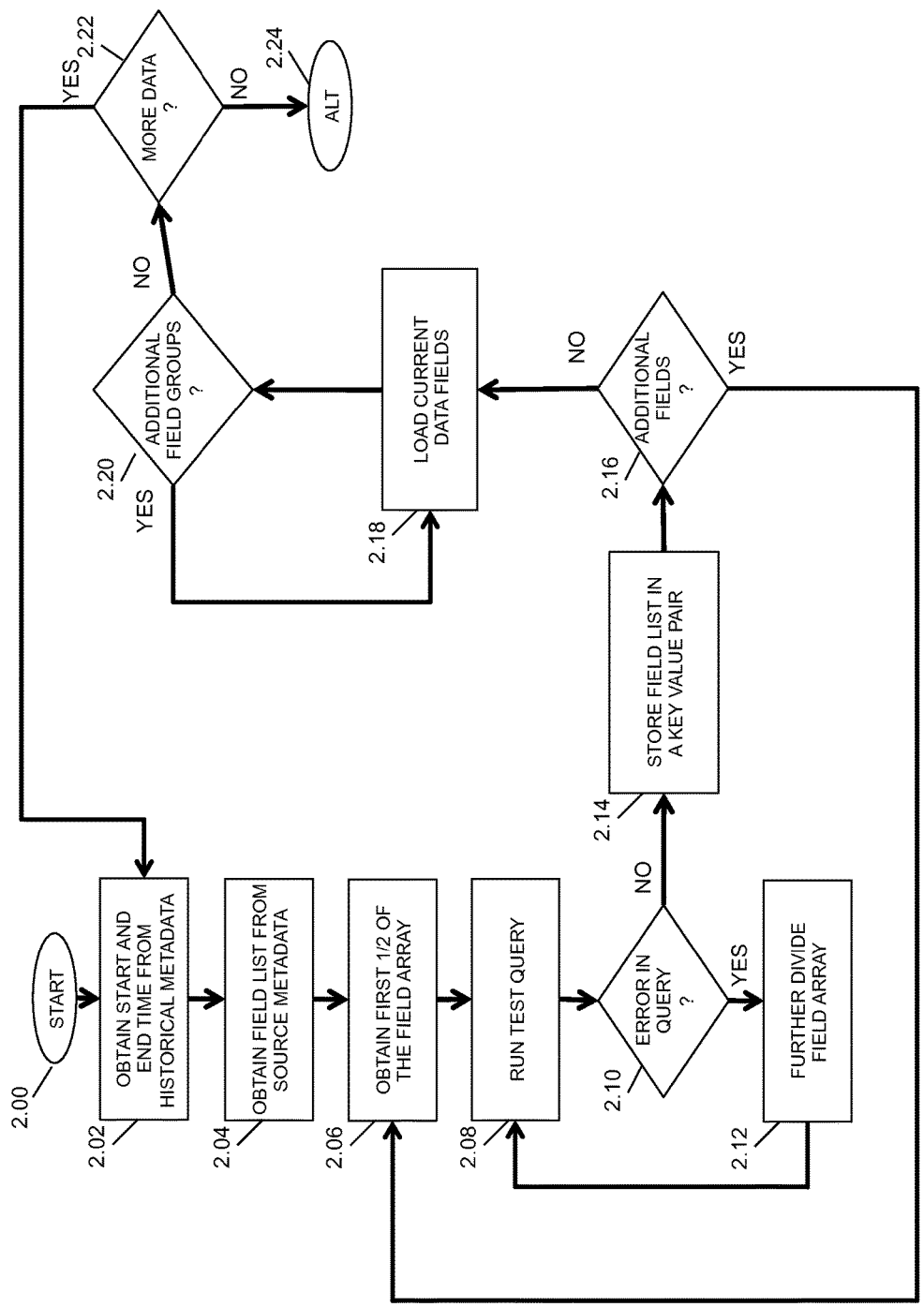
FIG. 2 is a flowchart of an aspect of the invented method, whereby the client generates, divides and loads a field array by means of a plurality of software queries.

Referring now generally to the Figures, and particularly to FIG. 2, FIG. 2 is a flowchart of an aspect of the invented method, whereby the client 120 generates, divides and loads a field array FLD.ARR.001-FLD.ARR.N by means of a plurality of software queries QRY.001-QRY.N. In step 2.02 the client 120 obtains an initial timestamp $T_0$ and a final timestamp $T_R$ from a set of historical metadata MDT.HST.001-MDT.HST.N of a software record REC.001-REC.N. In step 2.04 the client 120 obtains a list of data-containing software fields FLD.001-FLD.N falling within the $T_0$ and the $T_R$ defined in step 2.02 from the historical metadata MDT.HST.001-MDT.HST.N. The client 120 in step 2.06 obtains a first half of the field array FLD.ARR.001-FLD.ARR.N from the remote server 130. In step 2.08 the client 120 runs a test query QRY.TST.001-QRY.TST.001, to determine whether the field-containing query QRY.001-QRY.N is too large. The client 120 determines, in step 2.10, whether the test query QRY.TST.001-QRY.TST.001 is too large. When the determination in step 2.10 is positive, the client 120 advances to step 2.12, wherein the client 120 further divides the field array FLD.ARR.001-FLD.ARR.N. Subsequent to execution of step 2.12, the client 120 returns to step 2.08, and runs a further test query.

Alternatively, when the determination in step 2.10 is negative, i.e. when the client 120 determines that the test query QRY.TST.001-QRY.TST.001 is not too large, the client 120 advances to step 2.14. In step 2.14 the client 120 stores the fields FLD.001-FLD.N contained within the field array FLD.ARR.001-FLD.ARR.N. In step 2.16 the client 120 determines whether additional fields FLD.001-FLD.N must be transferred and stored. When the determination in step 2.16 is positive, the client 120 returns to step 2.06, and re-executes the loop of steps 2.06 through 2.16 until the determination in step 2.16 is negative. When the determination in step 2.16 is negative, the client 120 proceeds to step 2.18. In step 2.18 the client 120 loads the data associated with the fields FLD.001-FLD.N within the selected field array FLD.ARR.001-FLD.ARR.N. The client 120 determines, in step 2.20, whether additional field arrays FLD.ARR.001-FLD.ARR.N exists. When the determination in step 2.20 is positive, the client 120 returns to step 2.18. In the alternative, when the determination in step 2.20 is negative, the client 120 proceeds to step 2.22, wherein the client 120 determines whether additional data is present. When the determination in step 2.22 is positive, the client 120 returns to step 2.02 and re-executes the loop of steps 2.02 through 2.22 as necessary. Alternatively, when the determination in step 2.22 is negative, the client 120 proceeds to step 2.24 and executes alternate processes.

Figure 3:
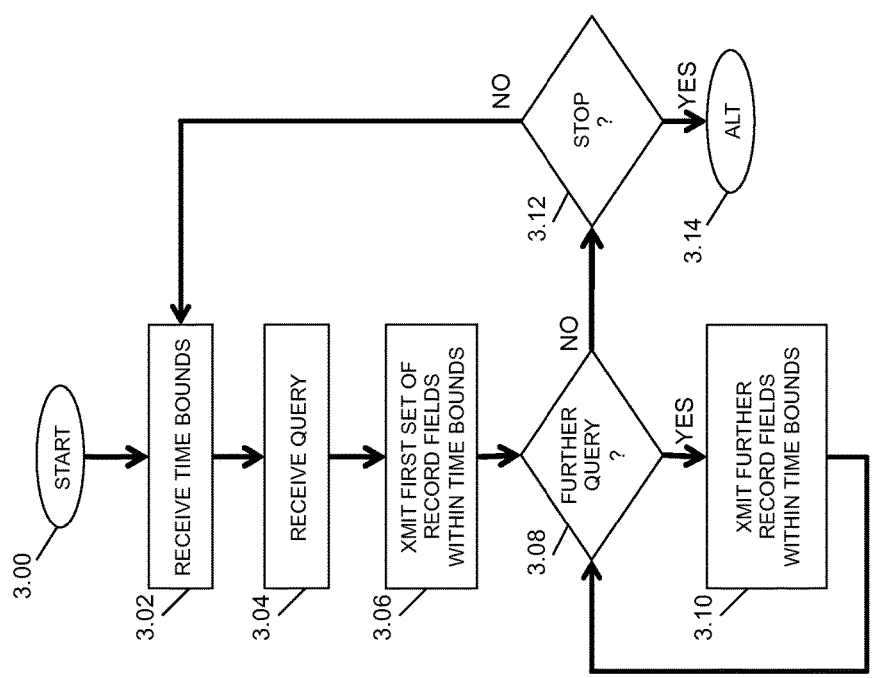
FIG. 3 is a flowchart of a further aspect of the invented method whereby the client iteratively forms and submits to the server field queries.

Referring now generally to the Figures, and particularly to FIG. 3, FIG. 3 is a flowchart of a yet further aspect of the invented method whereby the remote server 130 receives one or more queries QRY.001-QRY.N from the client 120, and transmits one or more records REC.001-REC.N to the client 120. In step 3.02 the remote server 130 receives the desired initial and final time bounds $T_O$ and $T_R$ from the client 120. In step 3.04 the remote server 130 receives one or more queries QRY.001-QRY.N from the client 120. In step 3.06 the remote server 130 transmits the first set of desired records REC.001-REC.N within the initial and final time bounds $T_O$ and $T_R$. In step 3.08 the remote server 130 determines whether a further query QRY.001-QRY.N has been received from the client 120. When the determination in step 3.08 is positive, the remote server 130 transmits the further records REC.001-REC.N with fields FLD.001-FLD.N falling within the initial and final time bounds $T_O$ and $T_R$ in step 3.10. From the execution of step 3.10, the remote server 130 returns to step 3.08. When the determination in step 3.08 is negative, the remote server 130 advances to step 3.12, wherein the remote server 130 determines whether to terminate the process. When the determination in step 3.12 is negative, the remote server 130 returns to step 3.02 and re-executes the loop of steps 3.02 through 3.12 as necessary. In the alternative, when the determination in step 3.12 is positive, the remote server 130 advances to step 3.14, wherein the remote server 130 executes alternate processes.

It is understood that the invented method as presented in FIG. 3 may as easily and correctly be executed by the local server 140 as by the remote server 130 as described in the Figure.

Figure 4A:
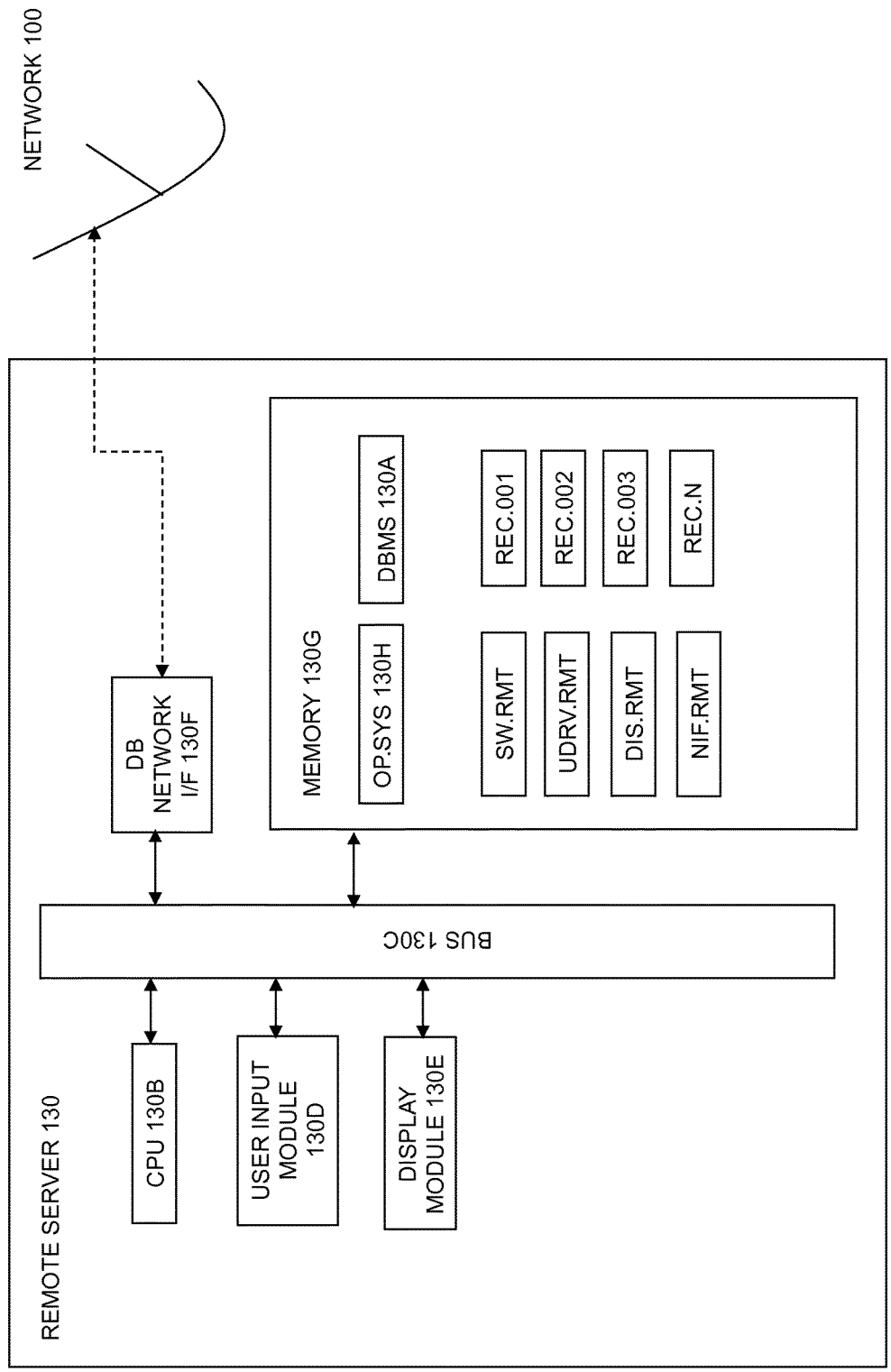
FIG. 4A is a block diagram of the remote server of FIG. 1.

Referring now generally to the Figures, and particularly to FIG. 4A, FIG. 4A is a block diagram of the remote server 130 of FIG. 1, wherein the remote server 130 comprises: a central processing unit ("CPU") 130B; a user input module 130D; a display module 130E; a software bus 130C bi-directionally communicatively coupled with the CPU 130B, the user input module 130D, the display module 130E; the software bus 130C is further bi-directionally coupled with a network interface 130F, enabling communication with alternate computing devices by means of the electronic communications network 100; and a memory 130G. The remote software bus 130C facilitates communications between the above-mentioned components of the remote server 130.

The memory 130G of the remote server 130 includes a remote software operating system OP.SYS 130H. The remote software OP.SYS 130H of the remote server 130 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, or WINDOWS 8™ operating system as marketed by Microsoft Corporation of Redmond, Wash.; or the MAC OS X operating system or iPhone G4 OS™ as marketed by Apple, Inc. of Cupertino, Calif. The memory 130G further includes the remote system software program SW.RMT, a remote user input driver UDRV.RMT, a remote display driver DIS.RMT, and a remote network interface drive NIF.RMT. Within a remote DBMS 130A are a plurality of software records REC.001, REC.002, REC.003, and REC.N.

The exemplary remote system software program SW.RMT is optionally adapted to enable the remote server 130 to (a.) generate messages and communicate with the Client 120 and the local server 140, (b.) process communicate with and process messages received from the client 120 and the local server 140, and (c.) manage the remote DBMS 130A to perform, execute and instantiate all elements, aspects and steps as required of the remote server 130 to practice the invented method in its various preferred embodiments interaction with the client 120 and optionally the local server 140.

Figure 4B:
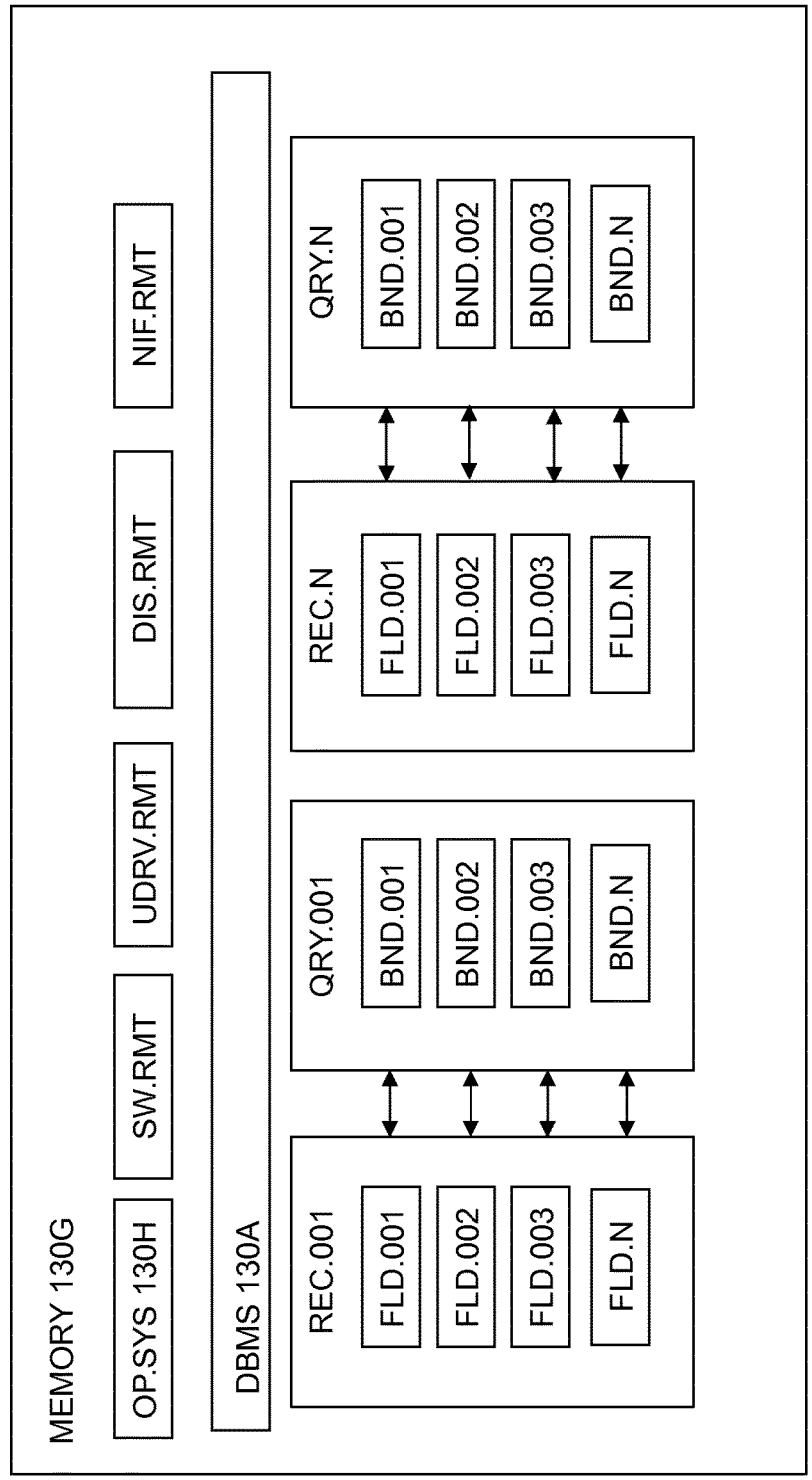
FIG. 4B is a block diagram of the memory of the remote server of FIG. 4.

Referring now generally to the Figures, and particularly to FIG. 4B, FIG. 4B is a block diagram of the memory 130G of the remote server 130 of FIG. 4A, wherein each of the software records REC.001-REC.N are paired with a designated query file QRY.001-QRY.N. Each of the software records REC.001-REC.N further contain a plurality of fields FLD.001-FLD.N, wherein each of the plurality of fields FLD.001-FLD.N is bi-directionally paired with a plurality of time boundaries BND.001-BND.N contained within each of the query files QRY.001-QRY.N.

Figure 5A:
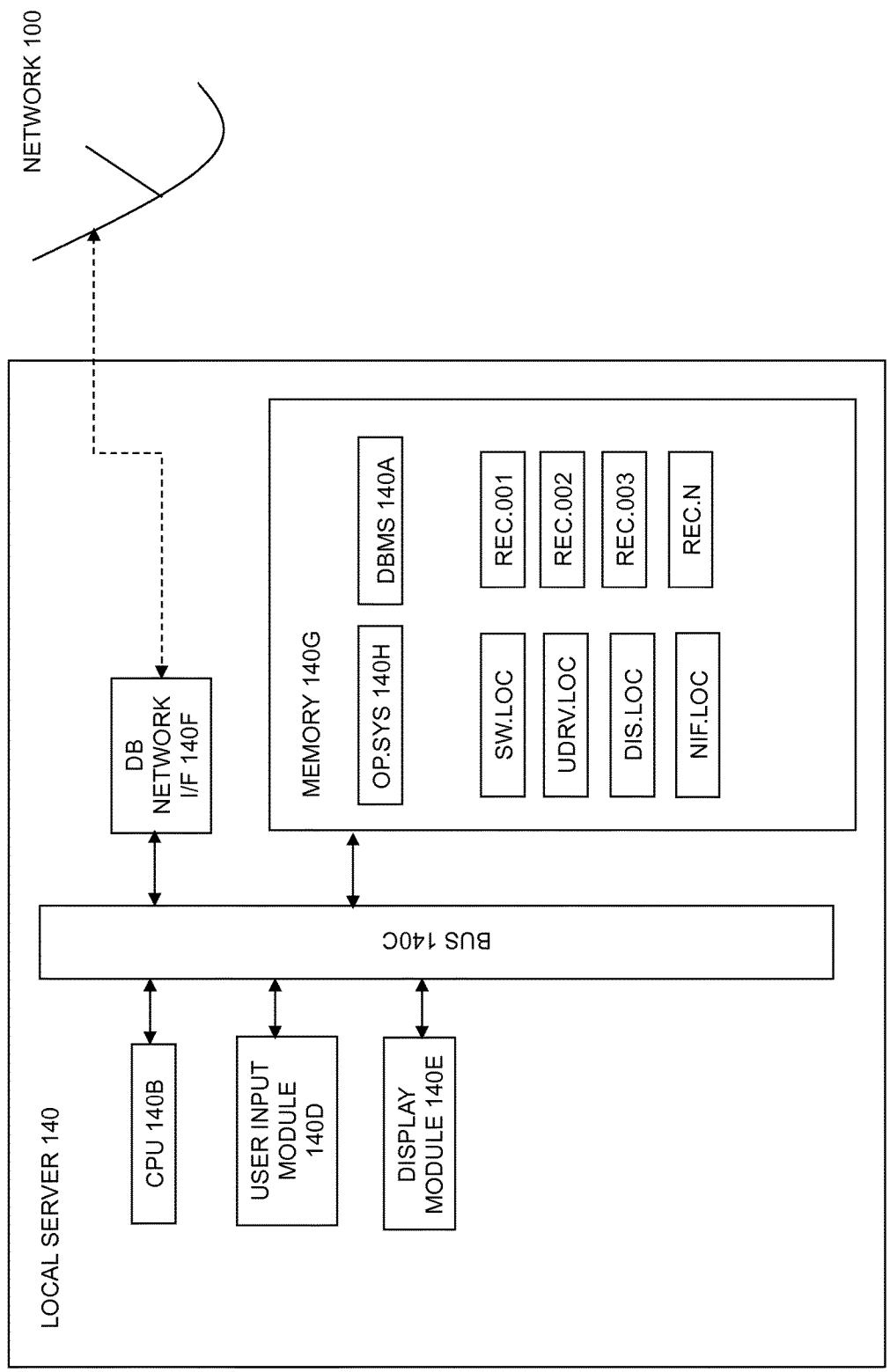
FIG. 5A is a block diagram of the local server of FIG. 1.

Referring now generally to the Figures, and particularly to FIG. 5A, FIG. 5A is a block diagram of the local server 140 of FIG. 1, wherein the local server 140 may comprise: a central processing unit ("CPU") 140B; a user input module 140D; a display module 140E; a software bus 140C bi-directionally communicatively coupled with the CPU 140B, the user input module 140D, the display module 140E; the software bus 140C is further bi-directionally coupled with a network interface 140F, enabling communication with alternate computing devices by means of the electronic communications network 100; and a memory 140G. The local software bus 140C facilitates communications between the above-mentioned components of the local server 140.

The memory 140G of the local server 140 includes a local software operating system OP.SYS 140H. The local software OP.SYS 140H of the local server 140 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, or WINDOWS 8™ operating system as marketed by Microsoft Corporation of Redmond, Wash.; or the MAC OS X operating system or iPhone G4 OS™ as marketed by Apple, Inc. of Cupertino, Calif. The local memory 140G further includes the local system software program SW.LOC, a local user input driver UDRV.LOC, a local display driver DIS.LOC, and a local network interface drive NIF.LOC. Within the local DBMS 140A hosted by the local server 140 are a plurality of software records REC.001, REC.002, REC.003, and REC.N.

The exemplary local system software program SW.LOC is optionally adapted to enable the local server 140 to (a.) generate messages and communicate with the Client 120 and the remote server 130, (b.) process communicate with and process messages received from the client 120 and the remote server 130, and (c.) manage the local DBMS 140A to perform, execute and instantiate all elements, aspects and steps as required of the local server 140 to practice the invented method in its various preferred embodiments interaction with the client 120 and optionally the remote server 130.

Figure 5B:
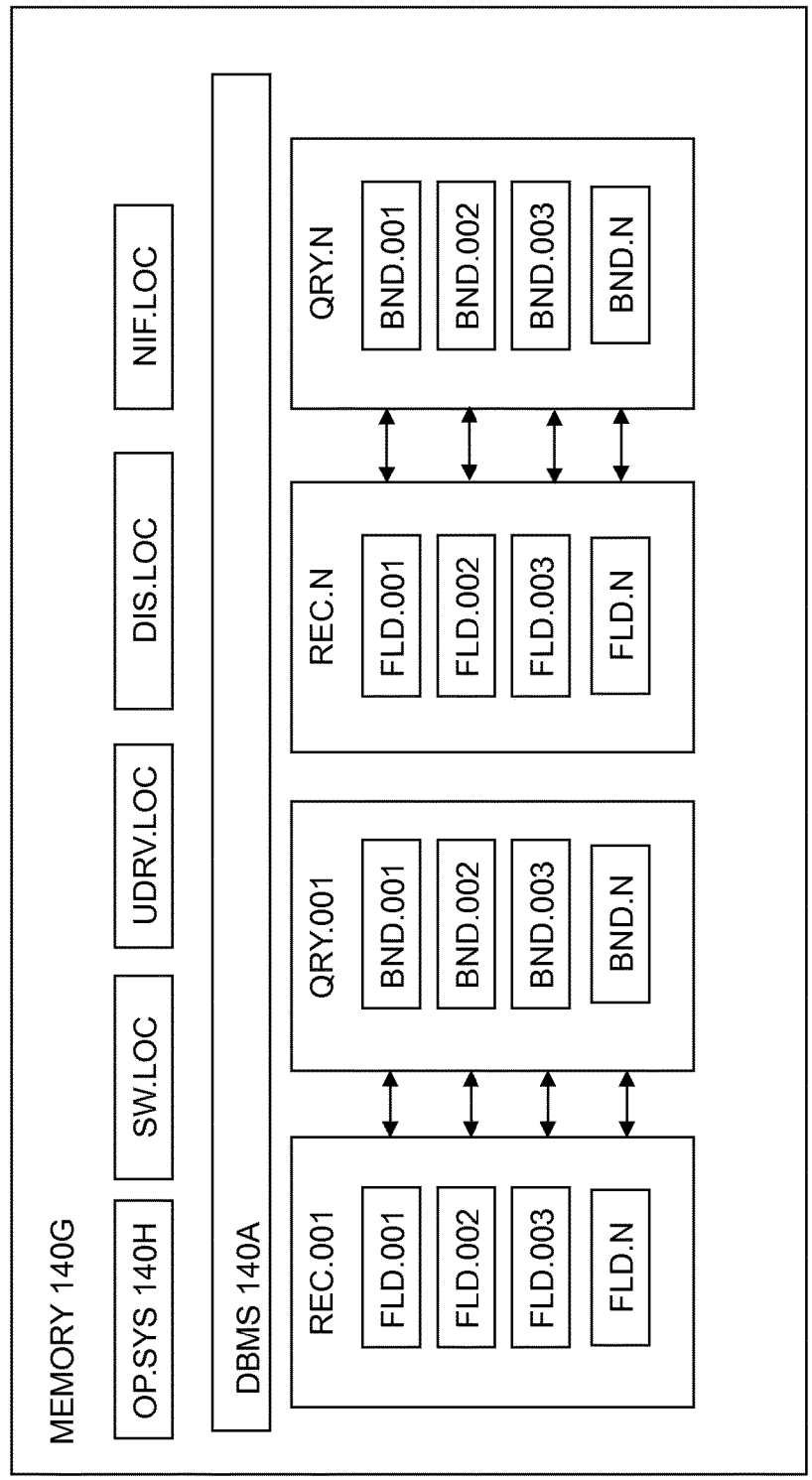
FIG. 5B is a block diagram of the memory of the local server of FIG. 5A.

Referring now generally to the Figures, and particularly to FIG. 5B, FIG. 5B is a block diagram of the memory 140G of the local server 140 of FIG. 5A, wherein each of the software records REC.001-REC.N are paired with a designated query file QRY.001-QRY.N. Each of the software records REC.001-REC.N further contain a plurality of fields FLD.001-FLD.N, wherein each of the plurality of fields FLD.001-FLD.N is bi-directionally paired with a plurality of time boundaries BND.001-BND.N contained within each of the query files QRY.001-QRY.N.

Figure 6A:
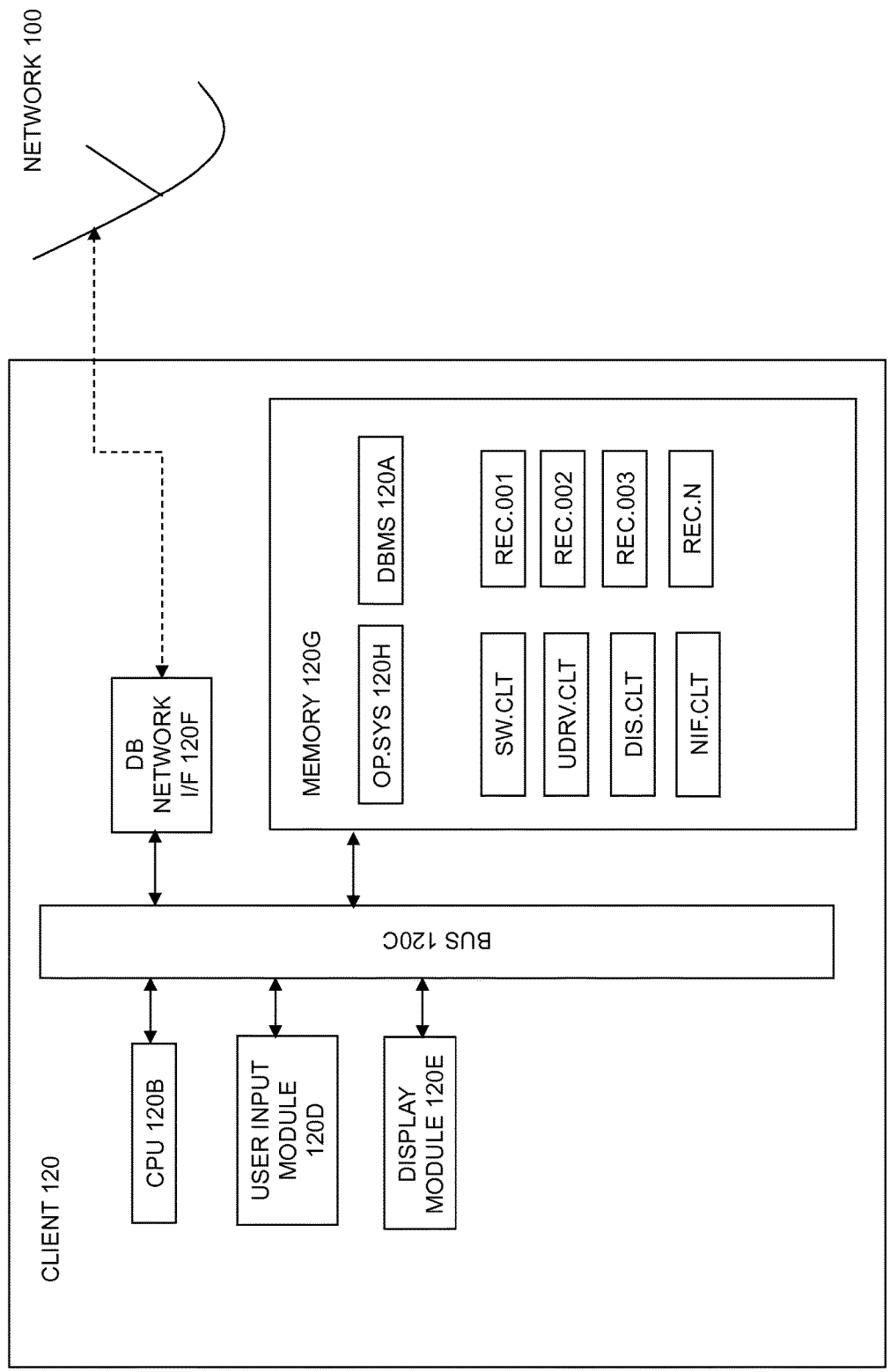
FIG. 6A is a block diagram of the client of FIG. 1.

Referring now generally to the Figures, and particularly to FIG. 6A, FIG. 6A is a block diagram of the client 120 of FIG. 1, wherein the client 120 comprises: a central processing unit ("CPU") 120B; a user input module 120D; a display module 120E; a software bus 120C bi-directionally communicatively coupled with the CPU 120B, the user input module 120D, the display module 120E; the software bus 120C is further bi-directionally coupled with a network interface 120F, enabling communication with alternate computing devices by means of the electronic communications network 100; and a memory 120G. The software bus 120C facilitates communications between the above-mentioned components of the client 120.

The memory 120G of the client 120 includes a client software operating system OP.SYS 120H. The software OP.SYS 120H of the client 120 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, VISTA™ or WINDOWS 7™ operating system as marketed by Microsoft Corporation of Redmond, Wash.; or the MAC OS X operating system or iPhone G4 OS™ as marketed by Apple, Inc. of Cupertino, Calif. The memory 120G further includes the client software program SW.CLT, a client user input driver UDRV.CLT, a client display driver DIS.CLT, and a client network interface drive NIF.CLT. Within a client DBMS 120A are a plurality of software records REC.001, REC.002, REC.003, and REC.N.

The exemplary client software program SW.CLT is optionally adapted to enable the client 120 to (a.) generate messages and communicate with the remote server 130 and the local server 140, (b.) process communicate with and process messages received from the remote server 130 and the local server 140, and (c.) manage the client DBMS 120A to perform, execute and instantiate all elements, aspects and steps as required of the client 120 to practice the invented method in its various preferred embodiments.

Figure 6B:
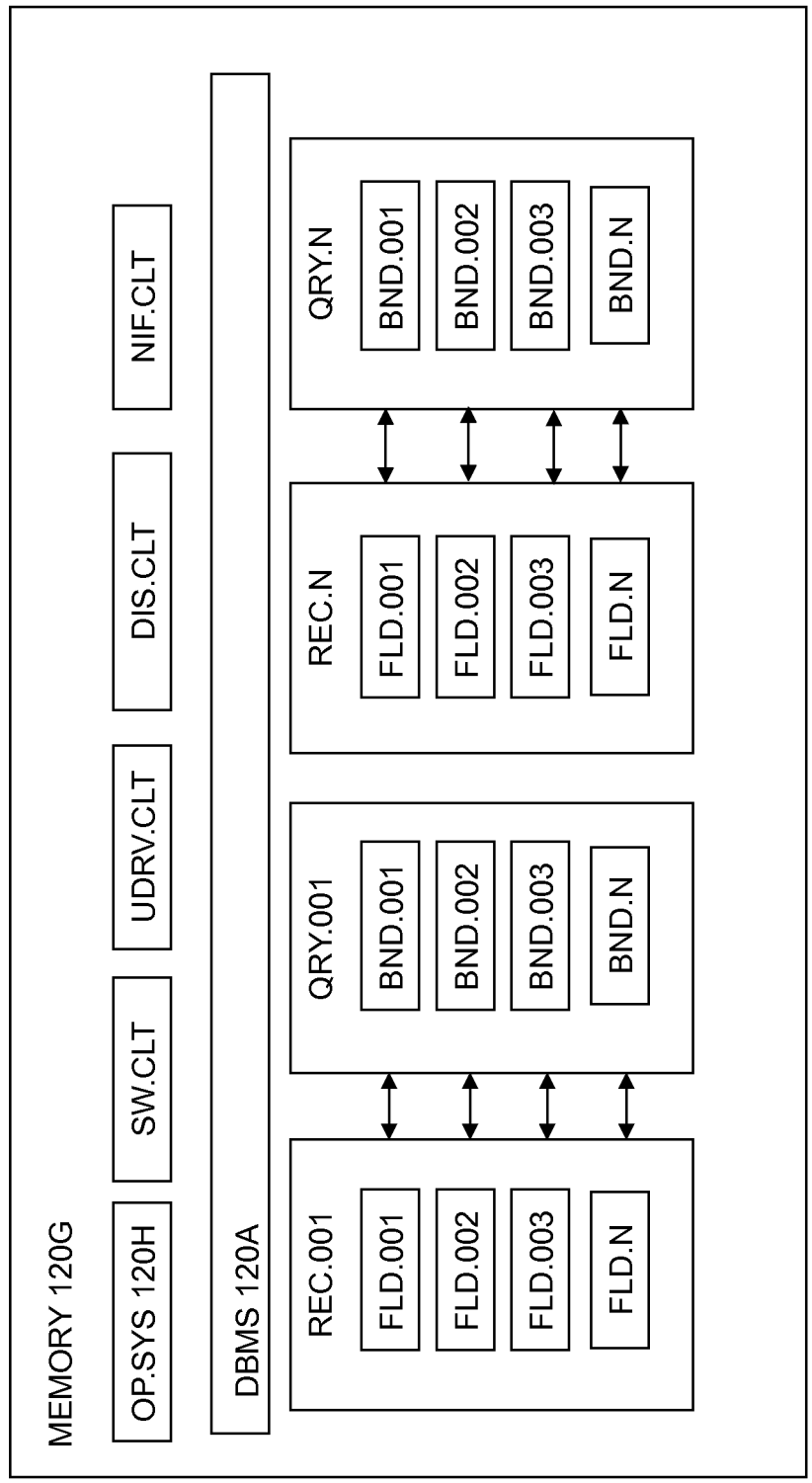
FIG. 6B is a block diagram of the memory of the client of FIG. 6A.

Referring now generally to the Figures, and particularly to FIG. 6B, FIG. 6B is a block diagram of the memory 120G of the client 120 of FIG. 6A, wherein each of the software records REC.001-REC.N are paired with a designated query file QRY.001-QRY.N. Each of the software records REC.001-REC.N further contain a plurality of fields FLD.001-FLD.N, wherein each of the plurality of fields FLD.001-FLD.N is bi-directionally paired with a plurality of time boundaries BND.001-BND.N contained within each of the query files QRY.001-QRY.N.

Referring now generally to the Figures, and particularly to FIGS. 7A through 7C, FIGS. 7A through 7C are a block diagrams of exemplary first data field FLD.001 through exemplary Nth data field FLD.N. The exemplary data fields FLD.001-FLD.N each contain, respectively: a data field identifier FLD.ID.001-FLD.ID.N for the purpose of identifying the data field FLD.001-FLD.N to either the client 120, the remote server 130, or to any other computing device connected to the client 120 and the remote server 130 by means of the network 100; a data field information-containing datum FLD.DATA.001-FLD.DATA.N; and a time date stamp DTS.001-DTS.N describing the time at which the data field FLD.001-FLD.N was initiated.

Referring now generally to the Figures, and particularly to FIG. 8A, FIG. 8A is a block diagram of an exemplary first software query QRY.001. The exemplary first software query QRY.001 contains: an exemplary first query identifier QRY.ID.001, by which the software query QRY.001 may be identified to the client 120, the remote server 130, or any other computing device connected to the client 120 and the remote server 130 by means of the network 100; a client address CLT.ADDR as the sending address; a remote server SRV.ADDR as the receiving address; a query datum QRY.DATA, which contains the information necessary to the query; and a time date boundary BND.001, by means of which the first query QRY.001 may identify the records REC.001-REC.N the first query QRY.001 is fetching.

Referring now generally to the Figures, and particularly to FIG. 8B, FIG. 8B is a block diagram of an exemplary first field message FLD.MSG.001. The first field message FLD.MSG.001 contains: a field message identification FLD.MSG.ID.001, by which the field message FLD.MSG.001 may be identified to the client 120, the remote server 130, or any other computing device connected to the client 120 and the remote server 130 by means of the network 100; the server address SRV.ADDR as the sending address; the client address CLT.ADDR as the receiving address; and a first date time stamp DTS.001 by which the first field message FLD.MSG.001 may be identified and bound.

Referring now generally to the Figures, and particularly to FIG. 9A, FIG. 9A is a block diagram of an exemplary first field array FLD.ARR.001. The exemplary first field array FLD.ARR.001 includes the initial timestamp $T_0$, the final timestamp $T_R$, and a plurality of fields FLD.001-FLD.N falling within the initial timestamp $T_0$ and the final timestamp $T_R$.

Referring now generally to the Figures, and particularly to FIG. 9B, FIG. 9B is a block diagram of an exemplary first piece of metadata history MDT.HIST.001. The exemplary first piece of metadata history MDT.HIST.001 contains at least the initial timestamp $T_0$, the final timestamp $T_R$, a unique record identifier REC.ID.001 and a last-accessed date time stamp ACS.DTS.001.

Referring now generally to the Figures, and particularly to FIG. 9C, FIG. 9C is a block diagram of an exemplary first test query QRY.TST.001. The exemplary first test query QRY.TST.001 comprises the initial timestamp $T_0$, the final timestamp $T_R$, a unique query identifier QRY.ID.001, and plurality of unique field identifiers FLD.ID.001-FLD.ID.N, each unique field identifier FLD.ID.001-FLD.ID.N corresponding to one of a plurality of fields FLD.001-FLD.N.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

We claim:

1. A computer-implemented method for data replication between a bi-directionally communicatively coupled server and a client, the method comprising:
   a. The client generating a field map representing all fields of a database record type;
   b. The client forming a first field query, the first field query specifying all fields of the database record type;
   c. The client submitting the first field query to the server;
   d. The client receiving an error message indicating a finding that a length of the query or a complexity of the query exceeds a system limitation;
   e. The client subsequently forming a second field query, the second field query specifying a plurality subset of record fields selected from all fields; and
   f. The client receiving a plurality of record field updates from the server and in association with a corresponding record identifier, the plurality of record field updates corresponding to the plurality subset of record fields specified on the second field query.

2. The method of claim 1, further comprising the client iteratively forming and submitting to the server a plurality of field queries until all fields of each record update are received by the client.

3. The method of claim 2, wherein no field is specified in more than one of the plurality of field queries.

4. The method of claim 1, wherein the first field query specifies one half of the fields denoted in the field map.

5. The method of claim 1, wherein the first field query specifies less than one half of the fields denoted in the field map.

6. The method of claim 1, further comprising forming a reduced field query, the reduced field query specifying a reduced number of fields as specified in a previous and failed earlier field query.

7. The method of claim 6, wherein the reduced field query specifies one half of the fields specified in the failed earlier field query.

8. The method of claim 6, wherein the reduced field query specifies less than one half of the fields specified in the failed earlier field query.

9. The method of claim 6, further comprising forming a second reduced field query, the second reduced field query specifying a reduced number of fields as specified in the failed earlier field query, wherein the second reduced field query does not specify fields specified in the first reduced field query.

10. The method of claim 1, further comprising filtering the records by a specified parameter.

11. The method of claim 10, further comprising filtering the records by a date-time stamp of each record.

12. The method of claim 1, wherein the first field query specifies fewer then all fields of the database record type and each record field included in the plurality subset of record fields specified in the second field query is specified in the first field query.

13. The method of claim 1, wherein the first field query specifies fewer then all fields of the database record type and at least one record field specified in the second field query is specified in the first field query.

14. A computer bi-directionally communicatively coupled with a server, the computer comprising:
   a. a memory storing instructions;
   b. a processor coupled with the memory, the processor and memory adapted to enable a database management software, and the processor when executing the instructions causes the computer to:
      (i.) generate a field map representing all fields of a database record type;
      (ii.) form a first field query, the first field query specifying all fields of the database record type;
      (iii.) submit the first field query to the server;
      (iv.) receive an error message indicating a finding that a length or the query or a complexity of the query exceeds a system limitation;
      (v.) subsequently forming a second field query, the second field query
   specifying a second plurality subset of record fields selected from the all fields of the database record type; and
      (vi.) receive a second plurality of record field updates from the server and in association with a corresponding record identifier, the second plurality of record field updates corresponding to the second field query.

15. The computer of claim 14, wherein the processor when executing the instructions causes the computer to filter the records by a specified parameter.

16. The computer of claim 15, wherein and the processor when executing the instructions causes the computer to filter the records by a date-time stamp of each record.

* * * * *